US011773746B2

United States Patent
Merritt et al.

(10) Patent No.: US 11,773,746 B2
(45) Date of Patent: Oct. 3, 2023

(54) TURBOMACHINERY ROTOR SHROUD WITH VARIABLE LATTICE DENSITIES

(71) Applicant: Hamilton Sundstrand Corporation, Charlotte, NC (US)

(72) Inventors: Brent J. Merritt, Southwick, MA (US); Darryl A. Colson, West Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/472,134

(22) Filed: Sep. 10, 2021

(65) Prior Publication Data

US 2023/0081155 A1    Mar. 16, 2023

(51) Int. Cl.
*F01D 25/24*      (2006.01)
*F01D 21/04*      (2006.01)
*F01D 11/08*      (2006.01)

(52) U.S. Cl.
CPC ............ *F01D 21/045* (2013.01); *F01D 11/08* (2013.01); *F01D 25/243* (2013.01); *F05D 2220/40* (2013.01); *F05D 2240/14* (2013.01); *F05D 2250/28* (2013.01); *F05D 2260/31* (2013.01)

(58) Field of Classification Search
CPC ..... F01D 21/045; F01D 21/04; F05D 2220/40
See application file for complete search history.

(56) References Cited

U.S. PATENT DOCUMENTS

| | | |
|---|---|---|
| 4,820,128 A | 4/1989 | Ito |
| 5,224,842 A | 7/1993 | Dziorny et al. |
| 7,766,603 B2 * | 8/2010 | Beckford ............. F01D 21/045 415/119 |
| 8,777,561 B2 | 7/2014 | Beers et al. |
| 9,181,959 B2 | 11/2015 | Rosen et al. |
| 9,611,784 B2 | 4/2017 | Beers et al. |
| 9,903,207 B2 | 2/2018 | Tozzi et al. |

(Continued)

FOREIGN PATENT DOCUMENTS

| | | |
|---|---|---|
| DE | 202013010209 U1 | 2/2015 |
| EP | 2312171 A2 | 4/2011 |

(Continued)

OTHER PUBLICATIONS

Aboulkhair, Nesma T., et al., "3D Printing of Aluminum alloys: Additive Manufacturing of Aluminum alloys using selective laser melting", Progress in Materials Science 106, 2019, 45 pages.

(Continued)

*Primary Examiner* — Eldon T Brockman

(74) *Attorney, Agent, or Firm* — Kinney & Lange, P.A.

(57) ABSTRACT

A rotor shroud for a rotary machine in a cabin air compressor includes a disk portion centered on a central axis of the rotor shroud, a frustoconical portion extending from the disk portion, a flared portion extending from the frustoconical portion, and a variable lattice structure in an interior of the rotor shroud. The variable lattice structure includes a first region of the rotor shroud having a first lattice structure and a second region of the rotor shroud having a second lattice structure. The second lattice structure of the second region is denser than the first lattice structure of the first region. The second region is a deflection region, a stress region, or an energy containment region of the rotor shroud.

20 Claims, 6 Drawing Sheets

(56) References Cited

U.S. PATENT DOCUMENTS

| | | | |
|---|---|---|---|
| 10,036,258 B2 | 7/2018 | Mongillo et al. | |
| 10,077,664 B2 | 9/2018 | Clum et al. | |
| 10,132,327 B2 | 11/2018 | Beers et al. | |
| 10,174,765 B2 | 1/2019 | Colson et al. | |
| 10,221,694 B2 | 3/2019 | Snyder | |
| 10,281,053 B2 | 5/2019 | Griffin et al. | |
| 10,557,464 B2 | 2/2020 | Scancarello et al. | |
| 10,633,976 B2 | 4/2020 | Nissen et al. | |
| 10,634,143 B2 | 4/2020 | Scancarello et al. | |
| 10,730,112 B2 | 8/2020 | Welch | |
| 10,774,653 B2 * | 9/2020 | Theertham | F01D 5/18 |
| 10,830,249 B2 | 11/2020 | Pulnikov | |
| 10,982,672 B2 | 4/2021 | Scancarello et al. | |
| 11,015,482 B2 | 5/2021 | Kasal et al. | |
| 11,047,387 B2 | 6/2021 | Wu et al. | |
| 11,168,568 B2 | 11/2021 | Theertham | |
| 11,187,149 B2 * | 11/2021 | Kobielski | B33Y 80/00 |
| 11,248,595 B2 | 2/2022 | Scancarello et al. | |
| 2003/0005705 A1 | 1/2003 | Chan et al. | |
| 2006/0062665 A1 | 3/2006 | Mcauliffe et al. | |
| 2006/0104816 A1 | 5/2006 | Kraemer et al. | |
| 2010/0215506 A1 | 8/2010 | Heyes et al. | |
| 2012/0064815 A1 | 3/2012 | Beers et al. | |
| 2012/0156043 A1 | 6/2012 | Colson et al. | |
| 2014/0026993 A1 | 1/2014 | Rosen et al. | |
| 2014/0044531 A1 | 2/2014 | Rosen et al. | |
| 2014/0112774 A1 | 4/2014 | Freeman et al. | |
| 2014/0186161 A1 | 7/2014 | Colson et al. | |
| 2015/0098805 A1 | 4/2015 | Beers et al. | |
| 2015/0285296 A1 | 10/2015 | Simon et al. | |
| 2015/0345396 A1 | 12/2015 | Zelesky et al. | |
| 2016/0001351 A1 | 1/2016 | Gunther et al. | |
| 2016/0177765 A1 | 6/2016 | Lemoine et al. | |
| 2016/0186589 A1 | 6/2016 | Budnick et al. | |
| 2016/0356167 A1 | 12/2016 | Beers et al. | |
| 2017/0002826 A1 | 1/2017 | Byon | |
| 2017/0009595 A1 | 1/2017 | Mccaffrey | |
| 2017/0159447 A1 | 6/2017 | Clum et al. | |
| 2017/0182561 A1 | 6/2017 | Scancarello et al. | |
| 2017/0184086 A1 | 6/2017 | Scancarello et al. | |
| 2017/0184108 A1 | 6/2017 | Scancarello et al. | |
| 2017/0204873 A1 | 7/2017 | Beers et al. | |
| 2018/0038385 A1 | 2/2018 | Welch | |
| 2018/0209276 A1 | 7/2018 | Tozzi et al. | |
| 2019/0010827 A1 | 1/2019 | Mohammed et al. | |
| 2019/0024517 A1 | 1/2019 | Takeda et al. | |
| 2019/0032491 A1 | 1/2019 | Nissen et al. | |
| 2019/0070664 A1 | 3/2019 | Paniogue et al. | |
| 2019/0178085 A1 | 6/2019 | Ripolles Perez | |
| 2019/0178166 A1 | 6/2019 | Miller et al. | |
| 2019/0234313 A1 | 8/2019 | Kray et al. | |
| 2020/0040734 A1 | 2/2020 | Cox | |
| 2020/0141399 A1 | 5/2020 | Scancarello et al. | |
| 2020/0157968 A1 * | 5/2020 | Braun | F01D 21/045 |
| 2020/0165936 A1 | 5/2020 | Kasal et al. | |
| 2020/0182066 A1 | 6/2020 | Theertham | |
| 2020/0217206 A1 | 7/2020 | Nissen et al. | |
| 2020/0217321 A1 | 7/2020 | Scancarello et al. | |
| 2020/0340488 A1 | 10/2020 | Kobielski et al. | |
| 2021/0003016 A1 | 1/2021 | Theertham | |
| 2021/0025325 A1 * | 1/2021 | Kobielski | F02B 37/00 |
| 2021/0025405 A1 | 1/2021 | Kobielski et al. | |
| 2021/0156304 A1 * | 5/2021 | Kobielski | F02B 39/005 |
| 2021/0222588 A1 | 7/2021 | Kasal et al. | |
| 2021/0396179 A1 | 12/2021 | Balandier | |
| 2022/0099110 A1 | 3/2022 | Carr et al. | |
| 2022/0275809 A1 | 9/2022 | Kobielski et al. | |
| 2022/0349416 A1 | 11/2022 | Gaye et al. | |

FOREIGN PATENT DOCUMENTS

| | | |
|---|---|---|
| EP | 3721093 B1 | 8/2021 |
| FR | 2958353 A1 | 10/2011 |
| JP | 2016037901 A | 3/2016 |
| JP | 2017112764 A | 6/2017 |
| JP | 2019138443 A | 8/2019 |
| JP | 2019138444 A | 8/2019 |
| JP | 2021057980 A | 4/2021 |
| NO | 134668 B | 8/1976 |

OTHER PUBLICATIONS

Fairclough, Caty, "Advancing Additive Manufacturing with Sequential Simulations", Mar. 7, 2018, 12 pages.

Stapleton, Thomas J., et al., "Additive Manufacturing Technology to Enhance Environmental Control Life Support (ECLS) Equipment Performance While Reducing Its Weight and Volume", 45th International Conference on Environmental Systems, Jul. 12-16, 2015, 7 pages.

Extended European Search Report for European Patent Application No. 22194964.7, dated Jan. 30, 2023, 8 pages.

Extended European Search Report for European Patent Application No. 22193978.8, dated Jan. 30, 2023, 7 pages.

Extended European Search Report for European Patent Application No. 22195468.8, dated Feb. 10, 2023, 6 pages.

Xtended European Search Report for European Patent Application No. 22194843.3, dated Feb. 2, 2023, 7 pages.

Extended European Search Report for European Patent Application No. 22194929.0, dated Jan. 23, 2023, 7 pages.

Dong et al. Design and optimization of solid lattice hybrid structures fabricated by additive manufacturing, Elsevier Additive Manufacturing 33 (2020) 1011116, 1-12 (Year: 2020).

Tang et al. Bidirectional Evolutionary Structural Optimization (BESO) based design method for lattice structure to be fabricated by additive manufacturing, Elsevier Computer-Aided Design 69 (2015) 91-101 (Year: 2015).

Wang et al. Multi-scale design and optimization for solid-lattice hybrid structures and their application to aerospace vehicle components, Chinese Journal of Aeronautics, 92021, 34(5): 386-398 (Year: 2021).

Zhang et al. Optimization design of variable density lattice structure for additive manufacturing, Elsevier Energy 242 (2022) 122554, 1-10 (Year: 2022).

* cited by examiner

TURBOMACHINERY ROTOR SHROUD WITH VARIABLE LATTICE DENSITIES

BACKGROUND

The present disclosure relates to aircraft environmental control systems, and in particular, to a turbomachinery rotor shroud for a cabin air compressor.

Cabin air compressors are used in environmental control systems in aircraft to condition air for delivery to an aircraft cabin. Conditioned air is air at a temperature, pressure, and humidity desirable for aircraft passenger comfort and safety. At or near ground level, the ambient air temperature and humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from the air by the air cycle machine before the air is delivered to the aircraft cabin.

A cabin air compressor can be used to compress air for use in an environmental control system. The cabin air compressor includes a motor to drive a compressor section that in turn compresses air flowing through the cabin air compressor. This compressor section includes a rotor, which transfers rotational energy from the motor to a fluid. The rotor is surrounded by a rotor shroud which improves rotor efficiency and protects the surrounding components in case of rotor failure.

SUMMARY

A rotor shroud for a rotary machine in a cabin air compressor includes a disk portion centered on a central axis of the rotor shroud, a frustoconical portion extending from the disk portion, a flared portion extending from the frustoconical portion, and a variable lattice structure in an interior of the rotor shroud. The variable lattice structure includes a first region of the rotor shroud having a first lattice structure and a second region of the rotor shroud having a second lattice structure. The second lattice structure of the second region is denser than the first lattice structure of the first region. The second region is a deflection region, a stress region, or an energy containment region of the rotor shroud.

A rotary machine includes a tie rod extending through the rotary machine, a rotor mounted on the tie rod, and a rotor shroud positioned radially outward of the rotor. The rotor shroud includes a disk portion centered on a central axis of the rotor shroud, a frustoconical portion extending from the disk portion, a flared portion extending from the frustoconical portion, and a variable lattice structure in an interior of the rotor shroud. The variable lattice structure includes a first region of the rotor shroud having a first lattice structure and a second region of the rotor shroud having a second lattice structure. The second lattice structure of the second region is denser than the first lattice structure of the first region. The second region is a deflection region, a stress region, or an energy containment region of the rotor shroud.

DETAILED DESCRIPTION

Figure 1:
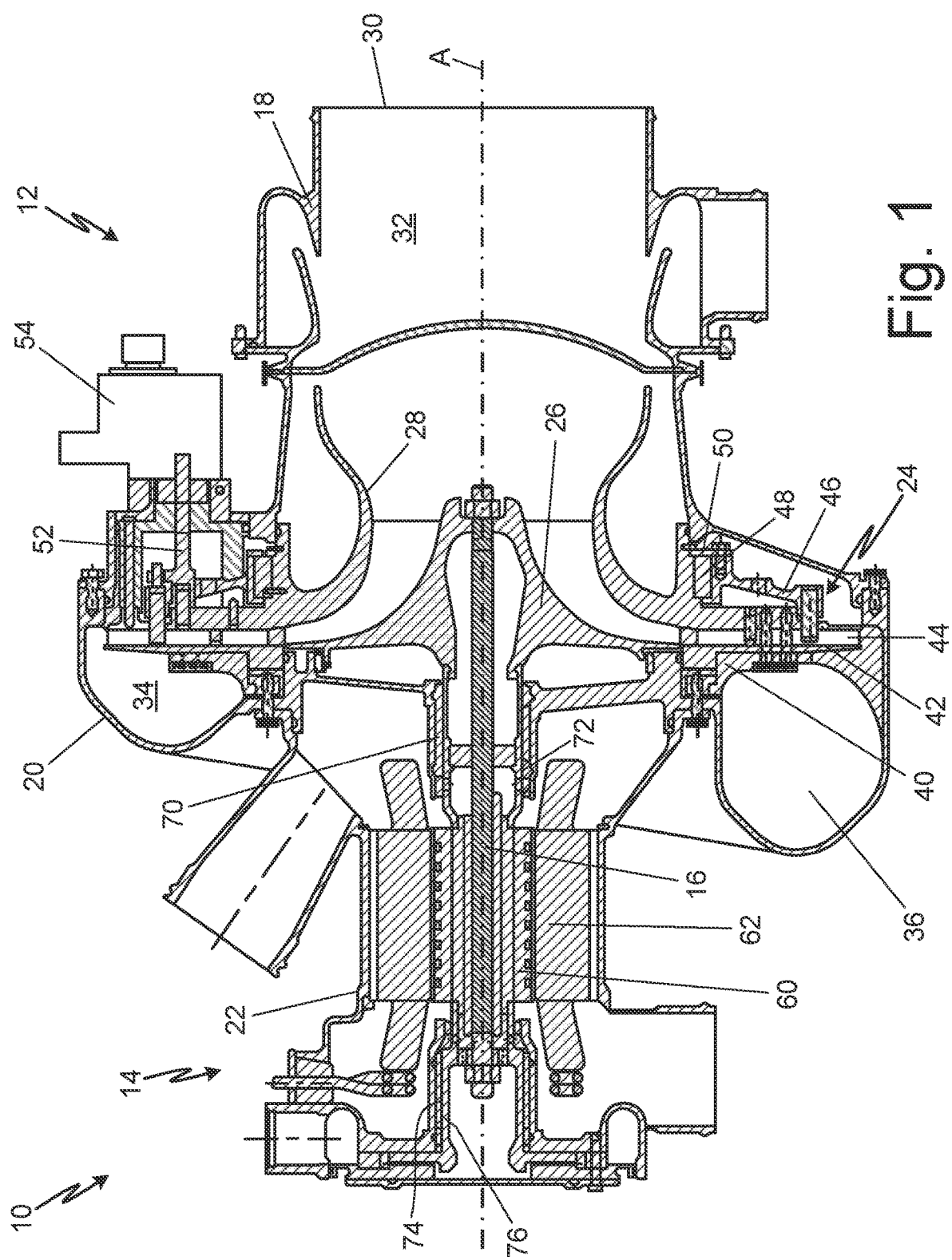
FIG. 1 is cross-sectional view of a cabin air compressor.

FIG. 1 is a cross-sectional view of cabin air compressor 10. Cabin air compressor 10 includes compressor section 12, motor section 14, tie rod 16, compressor inlet housing 18, compressor outlet housing 20, motor housing 22, variable diffuser 24, rotor 26, and rotor shroud 28. Compressor inlet housing 18 includes inlet 30 and inlet duct 32. Compressor outlet housing 20 includes outlet duct 34 and outlet 36. Variable diffuser 16 includes backing plate 40, inboard plate 42, diffuser vanes 44, drive ring 46, drive ring bearing 48, backup ring 50, pinion 52, and variable diffuser actuator 54. Motor section 14 includes motor rotor 60 and motor stator 62. Cabin air compressor 10 further includes first journal bearing 70, first rotating shaft 72, second journal bearing 74, and second rotating shaft 76. FIG. 1 also shows axis A.

Cabin air compressor 10 includes compressor section 12 and motor section 14 mounted on tie rod 16. Tie rod 16 is configured to rotate about axis A. Compressor section 12 includes compressor inlet housing 18 and compressor outlet housing 20 that are connected to one another. Motor section 14 includes motor housing 22, which is connected to compressor outlet housing 20. Variable diffuser 24 is positioned between compressor inlet housing 18 and compressor outlet housing 20. Rotor 26 is positioned between compressor inlet housing 18 and compressor outlet housing 20. Rotor 26 is mounted on tie rod 16, which rotatably connects rotor 26 and motor section 14. Rotor shroud 28 is positioned radially outward from and partially surrounds compressor rotor 26.

Compressor inlet housing 18 includes inlet 30 and inlet duct 32. Inlet 30 is positioned at a first end of compressor inlet housing 18. Inlet duct 32 extends from inlet 30 through compressor inlet housing 18 to rotor 26. Compressor outlet housing 20 includes outlet duct 34 and outlet 36. Outlet duct 34 extends through compressor outlet housing 20 from rotor 26 to outlet 36.

Variable diffuser 16 includes backing plate 40, inboard plate 42, diffuser vanes 44, drive ring 46, drive ring bearing 48, pinion 50, backup ring 52, and variable diffuser actuator 54. Backing plate 40 abuts compressor outlet housing 20 on a first side and inboard plate 42 on a second side. Inboard plate 42 abuts backing plate 40 on a first side and diffuser vanes 44 on a second side. Diffuser vanes 44 abut inboard plate 42 on a first side and rotor shroud 28 on a second side. Diffuser vanes 44 are configured to direct the compressed air from rotor 26 into outlet duct 34. Drive ring 46 is positioned radially outward from rotor shroud 28, and drive ring bearing 48 is positioned between driver ring 46 and rotor shroud 28. Drive ring 46 abuts rotor shroud 28 on a first side and backup ring 50 on a second side. Backup ring 50 is positioned radially outward of rotor shroud 28. Pinion 52 is connected to variable diffuser actuator 54 and is coupled to drive ring 46. Pinion 52 permits control of variable diffuser 16. Drive ring 46 is coupled to diffuser vanes 44 with pins, and as drive ring 46 is rotated it will drag diffuser vanes 44 and cause them to rotate.

Motor section 14 includes motor housing 22, motor rotor 60, and motor stator 62. Motor housing 22 surrounds motor rotor 60 and motor stator 62. Motor rotor 60 is disposed within motor stator 62 and is configured to rotate about axis A. Motor rotor 60 is mounted to tie rod 16 to drive rotation of tie rod 16.

Motor rotor 60 of motor section 14 drives rotation of shafts in cabin air compressor 10, which in turn rotate rotor 26. The rotation of rotor 26 draws air into inlet 30 of compressor inlet housing 18. The air flows through inlet duct 32 to rotor 26 and will be compressed by rotor 26. The compressed air is then routed through variable diffuser 16 and into outlet duct 34 of compressor outlet housing 20. The air then exits cabin air compressor 10 through outlet 36 of compressor outlet housing 20 and can be routed to another component of an environmental control system, such as an air cycle machine.

Cabin air compressor 10 further includes first journal bearing 70, first rotating shaft 72, second journal bearing 74, and second rotating shaft 76. First journal bearing 70 is positioned in compressor section 12 and is supported by compressor outlet housing 20. First rotating shaft 72 extends between and rotates with rotor 26 and motor rotor 60. Motor rotor 60 drives rotation of rotor 26 with first rotating shaft 72. A radially outer surface of first rotating shaft 72 abuts a radially inner surface of first journal bearing 70. Second journal bearing 74 is positioned in motor section 14 and is supported by motor housing 22. Second rotating shaft 76 extends from and rotates with motor rotor 60. A radially outer surface of second rotating shaft 76 abuts a radially inner surface of second journal bearing 74.

Figure 2A:
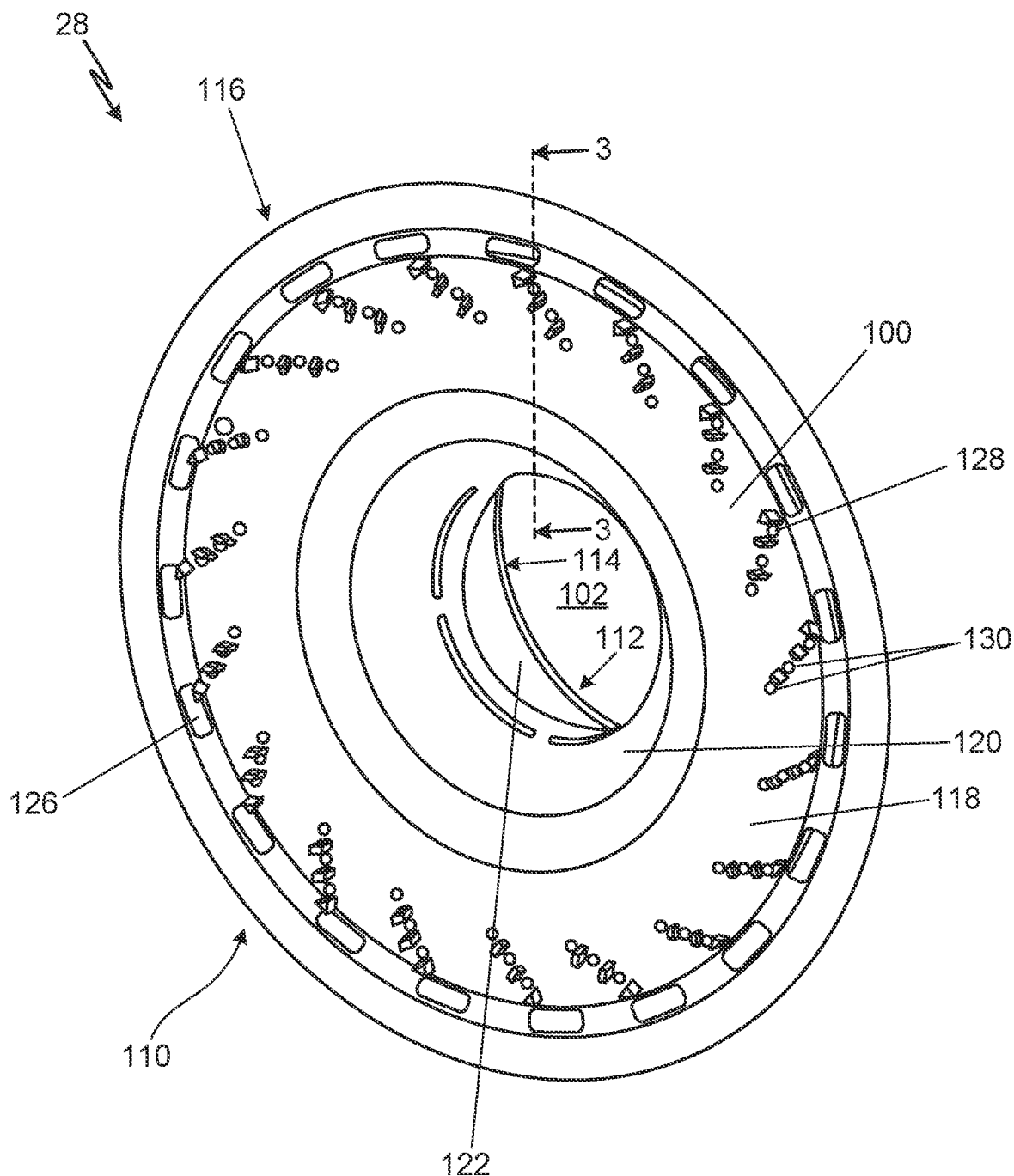
FIG. 2A is a perspective view of a first side of a rotor shroud of the cabin air compressor.
Figure 2B:
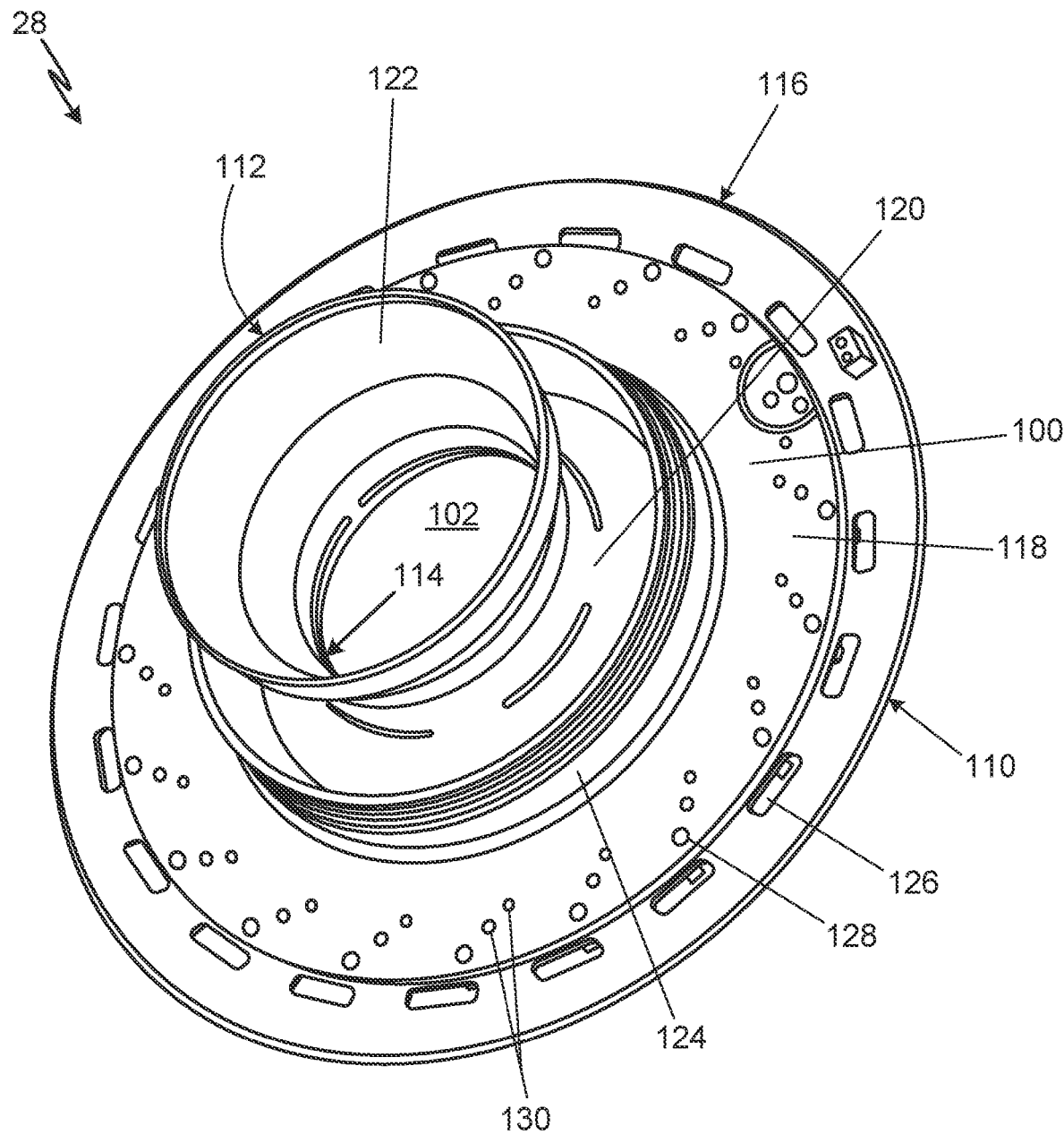
FIG. 2B is a perspective view of a second side of the rotor shroud of the cabin air compressor.
Figure 3:
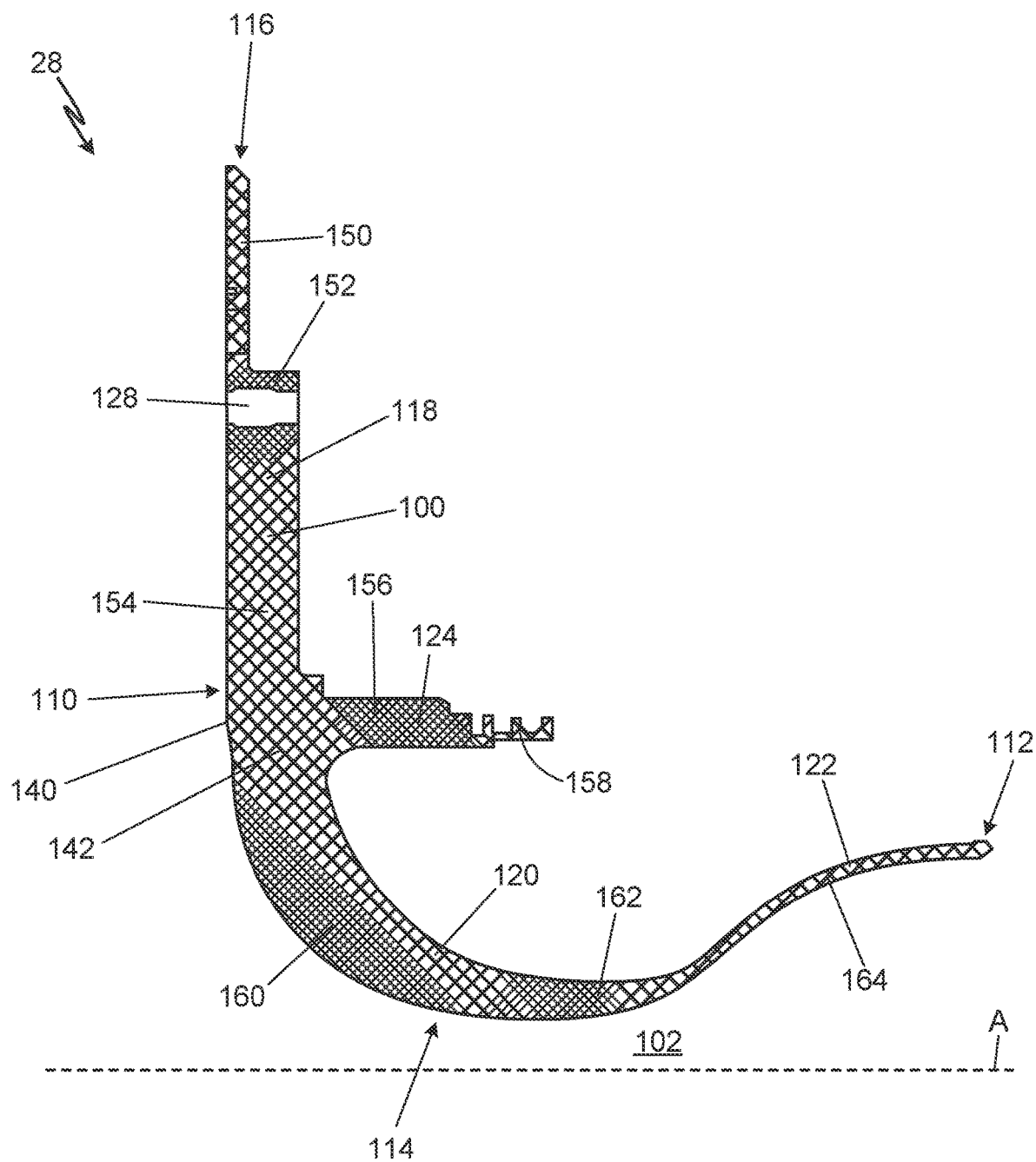
FIG. 3 is a cross-sectional view of the rotor shroud taken along section line 3-3 of FIG. 2A.

FIG. 2A is a perspective view of a first side of rotor shroud 28 of cabin air compressor 10. FIG. 2B is a perspective view of a second side of rotor shroud 28 of cabin air compressor 10. FIG. 3 is a cross-sectional view of the rotor shroud taken along the section line 3-3 of FIG. 2A. FIGS. 2A-3 will be discussed together. Rotor shroud 28 includes body 100 and bore 102. Body 100 includes first side 110, second side 112, radially inner end 114, radially outer end 116, disk portion 118, frustoconical portion 120, flared portion 122, flange 124 (shown in FIGS. 2B-3), openings 126 (shown in FIGS. 2A-2B), bolt holes 128, and bolt holes 130. As shown in FIG. 3, body 100 further includes exterior surface 140 and lattice structure 142, which includes first region 150, second region 152, third region 154, fourth region 156, fifth region 158, sixth region 160, seventh region 162, and eighth region 164.

Rotor shroud 28 includes body 100 with bore 102 extending through a center of body 100. Body 100 has first side 110 and second side 112 opposite of first side 110. Body 100 also has radially inner end 114 and radially outer end 116 opposite of radially inner end 114. Radially inner end 114 of body 100 defines bore 102 extending through body 100 of rotor shroud 28.

Body 100 includes disk portion 118 extending from radially outer end 116 to frustoconical portion 120. Disk portion 118 is a generally flat portion of body 100. Frustoconical portion 120 extends from disk portion 118 to flared portion 122. Frustoconical portion 120 has a generally frustoconical shape with a wider portion that tapers to a narrower portion radially inwards towards radially inner end 114 and axially outwards towards second side 112. Flared portion 122 extends from frustoconical portion 120 to second side 112. Flared portion 122 has a narrower portion adjacent frustoconical portion 120 and flares radially outward towards radially outer end 116.

Flange 124 is adjacent to a radially inner end of disk portion 118 and extends axially away from disk portion 118 towards second side 112. Flange 124 includes grooves that are configured to receive o-rings to seal against other components of cabin air compressor 10. Openings 126 include a plurality of openings positioned around a radially outer end of disk portion 118 and extend from first side 110 to second side 112 of disk portion 118. Bolt holes 128 include a plurality of holes positioned around disk portion 118 radially inward from openings 126. Bolt holes 128 extend from first side 110 to second side 112 of disk portion 118. Bolt holes 130 includes a plurality of holes positioned around disk portion 118 radially inward from bolt holes 128. Bolt holes 130 extend from first side 110 to second side 112 of disk portion 118.

Body 100 further includes exterior surface 140 that surrounds lattice structure 142 in an interior of body 100. Exterior surface 140 is a solid, continuous surface. Lattice structure 142 is a varying lattice structure. Lattice structure 142 has regions with varying densities. As shown in FIG. 3, lattice structure 142 has first region 150, second region 152, third region 154, fourth region 156, fifth region 158, sixth region 160, seventh region 162, and eighth region 164. Lattice structure 142 may vary gradually or abruptly between regions. Lattice structure 142 includes members arranged in a 3D crisscrossing pattern with voids between the members. As shown in FIG. 3, lattice structure 142 varies in density by having a varying distribution of the members and voids of lattice structure 142. In alternate embodiments, lattice structure 142 can vary in density by varying the thickness of the members, by having varying geometrical configurations, and/or by varying fillet radii on joints between the members.

First region 150 is a region of lattice structure 142 in disk portion 118 adjacent radially outer end 116. Second region 152 is a region of lattice structure 142 in disk portion 118 surrounding bolt holes 128. Third region 154 is a region of lattice structure 142 in disk portion 118 radially inward of bolt holes 128 and extending through frustoconical portion 120. Fourth region 156 is a region of lattice structure 142 in flange 124 extending from disk portion 118. Fifth region 158 is a region of lattice structure 142 in flange 124 at a second side of flange 124. Sixth region 160 is a region of lattice structure 142 in frustoconical portion 120 adjacent radially inner end 114 and first side 110 of body 100. Seventh region 162 is a region of lattice structure 142 in frustoconical portion 120 adjacent radially inner end 114 and near flared portion 122. Eighth region 164 is a region of lattice structure 142 extending from frustoconical portion 120 and through flared portion 122.

In the embodiment shown in FIG. 3, second region 152, fourth region 156, sixth region 160, and seventh region 162 have a greater density than first region 150, third region 154, fifth region 158, and eighth region 164. Rotor shroud 28 is additively manufactured, allowing lattice structure 142 to be manufactured with different densities in different areas of rotor shroud 28. Any suitable additive manufacturing process (also known as a 3D printing process) can be used to manufacture rotor shroud 28, including, for example, direct metal laser sintering, electron beam freeform fabrication, electron-beam melting, selective laser melting, or selective laser sintering. Rotor shroud 28 can be made out of any material that can be used in an additive manufacturing process, including any of stainless steel, corrosion-resistant steel, nickel-chromium alloy, aluminum, synthetic fiber, fiberglass, composites, and combinations thereof.

Traditional rotor shrouds for rotary machines have solid cross-sections and are manufactured by casting and/or subtractive manufacturing processes, such as hogout. Additively manufacturing rotor shroud 28 allows lattice structure 142 to be used in rotor shroud 28. Using lattice structure 142 in rotor shroud 28 allows rotor shroud 28 to have a reduced weight compared to traditional rotor shrouds, as there are voids between the lattice structure. At the same time, rotor shroud 28 will have an equivalent strength as traditional rotor shrouds due to the increased strength of lattice structure 142.

Further, the density of lattice structure 142 is varied to optimize mechanical properties of rotor shroud 28 locally and generally. Mechanical properties of rotor shroud 28, such as stress, strain, stiffness, and energy absorption, can be optimized to improve the performance of rotor shroud 28 by reducing stress in high stress regions of rotor shroud 28, reducing strain and increasing stiffness in deflection regions of rotor shroud 28, and increasing energy absorption capacity at energy containment regions of rotor shroud 28. Reducing stress and strain in local regions of rotor shroud 28 can also reduce stress and strain in rotor shroud 28 generally. Reducing the stresses in high stress regions can reduce the failure rate of components in cabin air compressor 10. Reduced failure rates result in reduced down time, reduced repairs, and reduced costs. Reducing the strain and increasing the stiffness in deflection regions can reduce the tolerances between blades of rotor 26 and rotor shroud 28. Reducing the tolerances between the blades of rotor 26 and rotor shroud 28 can increase the compression efficiency of cabin air compressor 10, as more air is forced through rotor 26 and into variable diffuser 24. Increased energy absorption capacity can improve the safe operation of cabin air compressor 10. Should rotor 26 fail, rotor shroud 26, compressor outlet housing 20, and other components in cabin air compressor 10 can contain this energy to protect other components of cabin air compressor 10.

Figure 4:
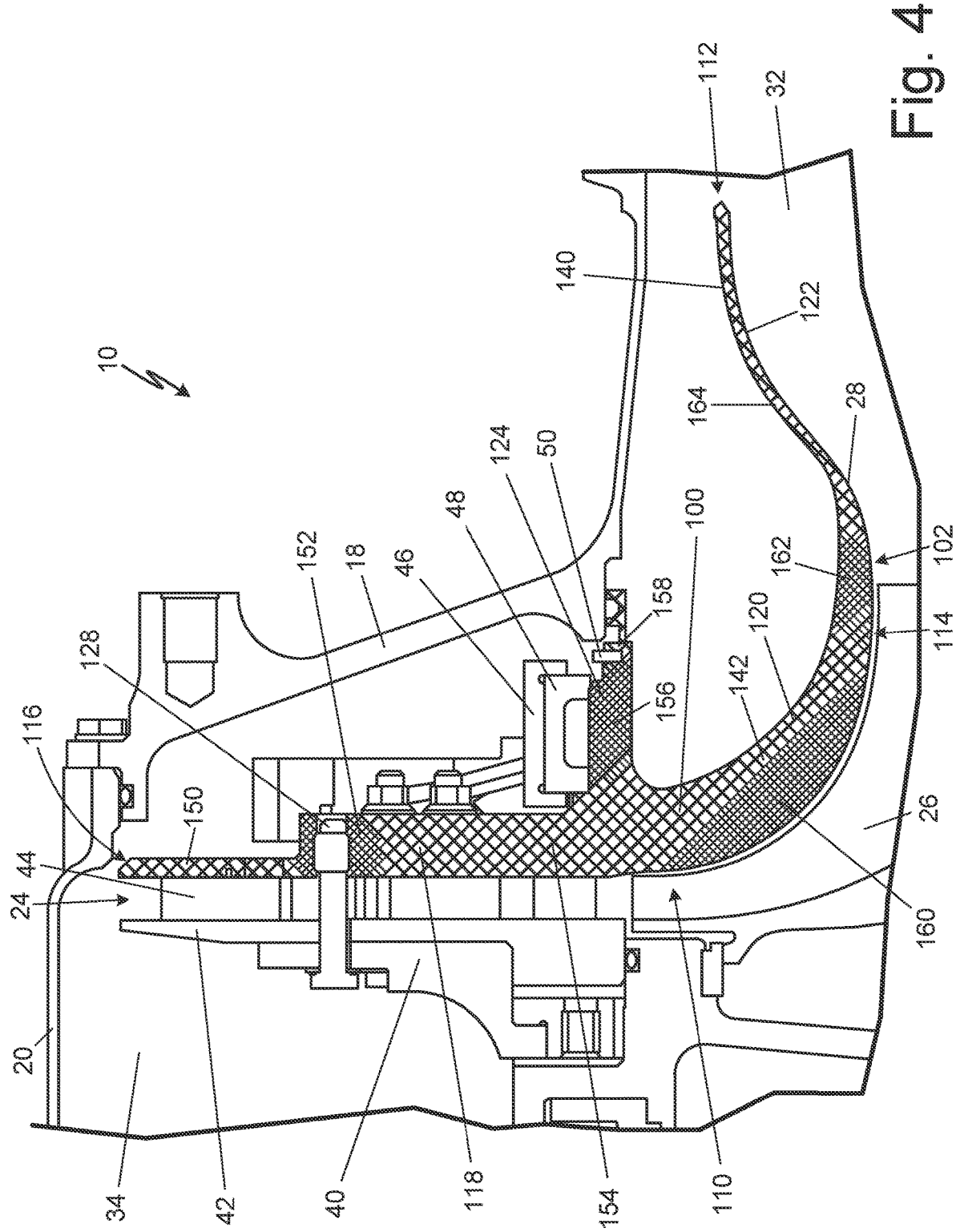
FIG. 4 is a cross-sectional view of the rotor shroud positioned in the cabin air compressor.

FIG. 4 is a cross-sectional view of rotor shroud 28 positioned in cabin air compressor 10. FIG. 4 shows compressor inlet housing 18, compressor outlet housing 20, motor housing 22, variable diffuser 24, rotor 26, and rotor shroud 28. Compressor inlet housing 18 includes inlet duct 32. Compressor outlet housing 20 includes outlet duct 34. Variable diffuser 24 includes backing plate 40, inboard plate 42, diffuser vanes 44, drive ring 46, drive ring bearing 48, and backup ring 50. Rotor shroud 28 includes body 100 and bore 102. Body 100 includes first side 110, second side 112, radially inner end 114, radially outer end 116, disk portion 118, frustoconical portion 120, flared portion 122, flange 124, and bolt holes 128. As shown in FIG. 4, body 100 further includes exterior surface 140 and lattice structure 142, which includes first region 150, second region 152, third region 154, fourth region 156, fifth region 158, sixth region 160, seventh region 162, and eighth region 164.

Cabin air compressor 10 has the structure and design as described above in reference to FIG. 1. Rotor shroud 28 has the structure and design as described above in reference to FIGS. 2A-3. Rotor shroud 28 is positioned radially outward from rotor 26 and partially surrounds rotor 26. First side 110 of disk portion 118 of rotor shroud 28 is positioned adjacent to diffuser vanes 44. Second side 112 of disk portion 118 of rotor shroud 28 is positioned adjacent to drive ring 46. Bolts extend through backing plate 40, inboard plate 42, diffuser vanes 44, and bolt holes 128 of rotor shroud 28 to connect backing plate 40, inboard plate 42, diffuser vanes 44, and rotor shroud 28. Bolts extend through drive ring 46 into bolt holes 130 of rotor shroud 28 to connect rotor shroud 28 to drive ring 46. Frustoconical portion 120 of rotor shroud 28 is adjacent to and curves along blades of rotor 26. Flared portion 122 of rotor shroud 28 extends into inlet duct 32 of compressor inlet housing 18. Flange 124 of rotor shroud 28 has a radially outer surface that abuts drive ring bearing 48. Flange 124 also has grooves to receive o-rings that are positioned against and sealed against compressor inlet housing 18.

Rotor shroud 28 has fourth region 156 of lattice structure 142 in flange 124. Fourth region 156 is a deflection region of rotor shroud 28, which is a region of rotor shroud 28 that is subject to deflection. As drive ring 46 rotates against drive ring bearing 48, fourth region 156 of flange 124 is subject to deflection. Fourth region 156 of lattice structure 142 is an area of increased density that aids in deflection management of rotor shroud 28 to reduce and prevent deflection of rotor shroud 28. By reducing and preventing deflection of rotor shroud 28, the efficiency of cabin air compressor 10 can be increased.

Rotor shroud 28 has seventh region 162 of lattice region 142 in frustoconical portion 120 adjacent radially inner end 114 and near flared portion 122. Seventh region 162 is a deflection region of rotor shroud 28, which is a region of frustoconical portion 120 of rotor shroud 28 that is subject to deflection. As rotor 26 rotates, seventh region 162 of frustoconical portion 120 of rotor shroud 28 can be subject to deflection. Seventh region 162 of lattice structure 142 is an area of increased density that aids in deflection management of rotor shroud 28 to reduce and prevent deflection of rotor shroud 28. By reducing and preventing deflection of rotor shroud 28, the efficiency of cabin air compressor 10 can be increased.

There is a gap between blades of rotor 26 and rotor shroud 28 to prevent contact between the blades of rotor 26 and rotor shroud 28. Contact between the blades and rotor shroud 28 may damage both components and cause failure of cabin air compressor 10. The gap between the blades of rotor 26 and rotor shroud 28 has to account for deflection that rotor 26 and rotor shroud 28 can be subjected to during operation of rotor 26. Thus, the more deformation that rotor 26 and rotor shroud 28 are subjected to during operation of rotor 26, the larger the gap needs to be to ensure component safety. However, air can leak from cabin air compressor 10 through the gap, which leads to inefficiencies in cabin air compressor 10. Thus, it is desirable to minimize the gap between the blades of rotor 26 and rotor shroud 28. Identifying deflection regions of rotor shroud 28 and increasing the density of lattice structure 142 in the deflection regions (for example, fourth region 156 and seventh region 162) reduces and prevents the deflections and strain that rotor shroud 28 is subjected to during operation of rotor 26 by increasing the stiffness in these areas. This reduced deflection and strain and increased stiffness means that the parts deform less when in operation. If rotor shroud 28 undergoes less deflection, the gap between the blades of rotor 26 and rotor shroud 28 can be reduced. Reducing the gap increases the efficiency of cabin air compressor 10, as more air is forced through rotor 26 and into variable diffuser 24.

Rotor shroud 28 has second region 152 of lattice region 142 in disk portion 118 surrounding bolt holes 128. Second region 152 is a stress region of rotor shroud 28, which is a region of rotor shroud 28 that is subject to high stress during operation of rotor shroud 28. The high stress in stress regions of rotor shroud 28, such as second region 152, is a higher stress than stresses present in other regions of rotor shroud 28. During operation of variable diffuser 24, second region 152 will be subject to stress that transfers into disk portion 118 of rotor shroud 28 from the bolts extending through bolt holes 128. Second region 152 of lattice structure 142 is an area of increased density that aids in stress reduction during operation of cabin air compressor 10 to reduce the stress in second region 152 of rotor shroud 28. Stress reduction at critical points of rotor shroud 28 leads to increased longevity of rotor shroud 28.

Fourth region 156 is also a stress region of rotor shroud 28, which is a region of rotor shroud 28 that is subject to high stress during operation of rotor shroud 28. The high stress in stress regions of rotor shroud 28, such as fourth region 156, is a higher stress than stresses present in other regions of rotor shroud 28. As drive ring 46 rotates against drive ring bearing 48, fourth region 156 of flange 124 is subject to stress. Fourth region 156 of lattice structure 142 is an area of increased density that aids in stress reduction during operation of cabin air compressor 10 to reduce the stress in fourth region 156 of rotor shroud 28. Stress reduction at critical points of rotor shroud 28 leads to increased longevity of rotor shroud 28.

Reducing stress in stress regions of rotor shroud 28 will also improve the longevity of rotor shroud 28. Reducing the stresses at stress regions can reduce the failure rate of rotor shroud 28 as well as the failure rate of cabin air compressor 10 overall. During operation, these failures can damage components surrounding rotor shroud 28, as these components are required to contain the energy of the failure for safety of the aircraft and its passengers. Reduced failure rates result in reduced down time, reduced repairs, and reduced costs.

Rotor shroud 28 has sixth region 160 of lattice structure 142 in frustoconical portion 120 adjacent radially inner end 114 and first side 110 of body 100. Sixth region 160 is an energy containment region of rotor shroud 28, which is a region of rotor shroud 28 that is designed to absorb energy. Sixth region 160 of frustoconical portion 120 is positioned adjacent to blades on rotor 26 and needs to be designed to absorb energy from rotor 26 in the event of a failure of rotor 26. Sixth region 160 of lattice structure 142 is an area of increased density that aids in energy containment during operation of cabin air compressor 10. Energy containment at critical points of rotor shroud 28 ensures safe operation of cabin air compressor 10.

Increased energy containment is important to the safe operation of cabin air compressor 10. If rotor 26 fails, rotor shroud 28 is designed to absorb the energy to protect and prevent serious damage to other components of cabin air compressor 10. Sixth region 160 of lattice structure 142 is positioned near rotor 26 to contain the energy from rotor 26 in rotor shroud 28.

Rotor shroud 28 is one example of a rotor shroud in which variable lattice structure 142 can be used. In alternate embodiments, variable lattice structure 142 can be used in any suitable rotor shroud, for example a rotor shroud for a turbine rotor, having any design. Further, cabin air compressor 10 is one example of a turbomachinery or rotary machine in which rotor shroud 28 or any other rotor shroud with variable lattice structure 142 can be used. In alternate embodiments, rotor shroud 28 or any other rotor shroud with variable lattice structure 142 can be used in an air cycle machine or any other rotary machine.

Figure 5:
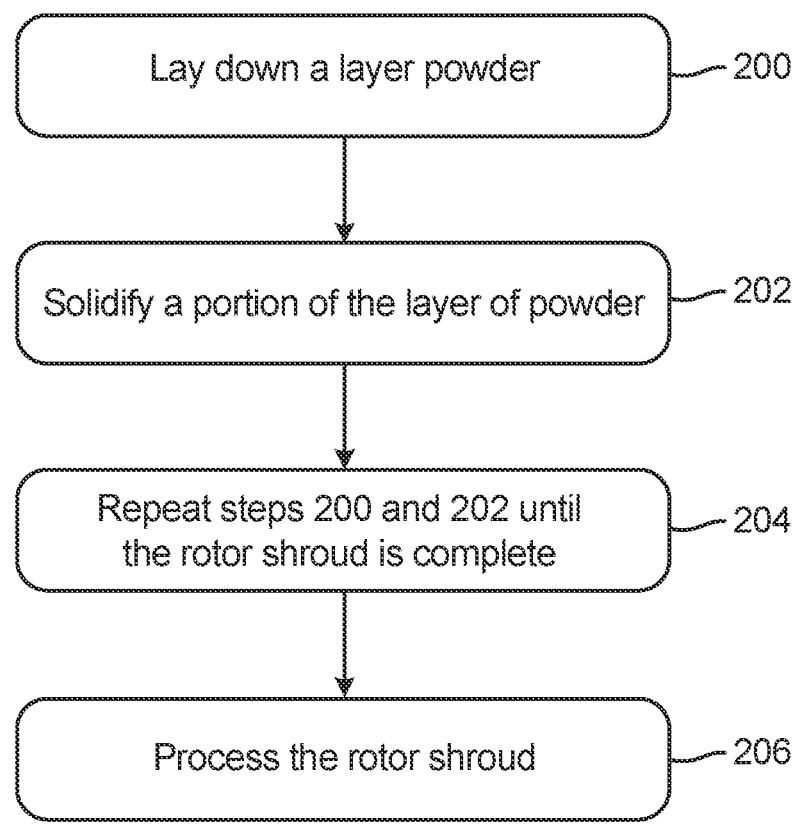
FIG. 5 is a flowchart showing a method of manufacturing the rotor shroud.

FIG. 5 is a flowchart showing a method of manufacturing rotor shroud 28. FIG. 5 shows steps 200-206. Step 200 includes laying down a layer of powder. Step 202 solidifying a portion of the layer of powder. Step 204 includes repeating steps 200 and 202 until rotor shroud 28 is completed. Step 206 includes processing rotor shroud 28.

Rotor shroud 28 can be manufactured using an additive manufacturing process. Additive manufacturing involves manufacturing rotor shroud 28 layer by layer. Additive manufacturing processes allow complex internal and external shapes and geometries to be manufactured that are not feasible or possible with traditional manufacturing. A typical additive manufacturing process involves using a computer to create a three-dimensional representation of rotor shroud 28. The three-dimensional representation will be converted into instructions which divide rotor shroud 28 into many individual layers. These instructions are then sent to an additive manufacturing device. This additive manufacturing device will print each layer, in order, and one at a time until all layers have been printed. Any additive manufacturing process can be used, including direct metal laser sintering, electron beam freeform fabrication, electron-beam melting, selective laser melting, selective laser sintering, or other equivalents that are known in the art.

Step 200 includes laying down a layer of powder. The powder can be made of a material selected from the group consisting of stainless steel, corrosion-resistant steel, nickel-chromium alloy, aluminum, synthetic fiber, fiberglass, composites, and combinations thereof. This powder may be laid down by a roller, pressurized gas, or other equivalents that are known in the art. This powder may have any grain size, wherein the grain size of the powder affects the unprocessed surface properties of rotor shroud 28.

Step 202 includes solidifying a portion of the layer of powder. A portion of the layer of powder can be solidified by applying energy to layer of powder. Any energy source can be used, including laser beam, electron beams, or other equivalents that are known in the art. The application of this energy will solidify the powder in a specific configuration. The specific configuration of solidified metal will be entirely dependent on which layer the process is currently at. This specific configuration will be in a specific shape and distribution so that when combined with the other layers, it forms rotor shroud 28.

Step 204 includes repeating steps 200 and 202 until rotor shroud 28 is completed. These two steps together lead to rotor shroud 28 being built layer by layer to completion. The specific configuration of step 202 consists of exterior surface 140, which is continuous and solid, and lattice structure 142, which has a varying density. The density of lattice structure 142 can be locally optimized to reduce stress or strain in specific regions and improve energy containment in specific regions. Reducing the stresses at high stress regions can reduce the failure rate of rotor shroud 28 and thus the failure rate of cabin air compressor 10. Reduced failure rates result in reduced down time, reduced repairs, and reduced costs. Reduced strain, and thus reduced deflection, at deflection regions means that the parts deform less when in operation. If rotor shroud 28 undergoes less deflection, the tolerances between components of cabin air compressor 10 can be reduced. Reducing tolerances between components increases the efficiency of cabin air compressor 10. Improving energy containment in energy containment regions of rotor shroud 28 ensures the safe operation of cabin air compressor 10.

Step 206 includes processing rotor shroud 28. Step 206 is an optional step. Processing rotor shroud 28 can include post processing steps, such as smoothing of exterior surface 140 of rotor shroud 28 or removal of powder from an interior of rotor shroud 28. Since an additive manufacturing process is used, exterior surface 140 of rotor shroud 28 may be rougher than desired. Through sanding, brushing, buffing, grinding, and combinations thereof, exterior surface 140 of rotor shroud 28 may be made smoother. Removal of the powder from an interior of rotor shroud 28 can involve the process of removing the unsolidified powder between lattice structure 142 through high pressure gas, mechanical movements, or other methods know in the art.

Discussion of Possible Embodiments

The following are non-exclusive descriptions of possible embodiments of the present invention.

A rotor shroud for a rotary machine in a cabin air compressor includes a disk portion centered on a central axis of the rotor shroud, a frustoconical portion extending from the disk portion, a flared portion extending from the frustoconical portion, and a variable lattice structure in an interior of the rotor shroud. The variable lattice structure includes a first region of the rotor shroud having a first lattice structure and a second region of the rotor shroud having a second lattice structure. The second lattice structure of the second region is denser than the first lattice structure of the first region. The second region is a deflection region, a stress region, or an energy containment region of the rotor shroud.

The rotor shroud of the preceding paragraph can optionally include, additionally and/or alternatively, any one or more of the following features, configurations and/or additional components:

The rotor shroud has a continuous exterior solid surface surrounding the variable lattice structure.

The stress region of the rotor shroud is a region of the rotor shroud that is subject to higher stress than other regions of the rotor shroud.

The stress region of the rotor shroud is a flange extending outward from the disk portion of the rotor shroud.

The stress region of the rotor shroud is a region of the rotor shroud surrounding a plurality of bolt holes.

The deflection region of the rotor shroud is a region of the rotor shroud that is subject to deflections.

The deflection region of the rotor shroud is a region of the frustoconical portion adjacent the flared portion.

The deflection region of the rotor shroud is a flange extending outward from the disk portion of the rotor shroud.

The energy containment region of the rotor should is a region of the rotor shroud that is configured to contain energy.

The energy containment region of the rotor shroud is a region of the frustoconical portion adjacent a first side and a radially inner end of the rotor shroud.

The rotor shroud is made of a material selected from the group consisting of stainless steel, corrosion-resistant steel, nickel-chromium alloy, aluminum, synthetic fiber, fiberglass, composites, and combinations thereof.

A rotary machine includes a tie rod extending through the rotary machine, a rotor mounted on the tie rod, and a rotor shroud positioned radially outward of the rotor. The rotor shroud includes a disk portion centered on a central axis of the rotor shroud, a frustoconical portion extending from the disk portion, a flared portion extending from the frustoconical portion, and a variable lattice structure in an interior of the rotor shroud. The variable lattice structure includes a first region of the rotor shroud having a first lattice structure and a second region of the rotor shroud having a second lattice structure. The second lattice structure of the second region is denser than the first lattice structure of the first region. The second region is a deflection region, a stress region, or an energy containment region of the rotor shroud.

The rotary machine of the preceding paragraph can optionally include, additionally and/or alternatively, any one or more of the following features, configurations and/or additional components:

The stress region of the rotor shroud is a region of the rotor shroud that is subject to higher stress than other regions of the rotor shroud.

The stress region of the rotor shroud is a flange extending outward from the disk portion of the rotor shroud that abuts a drive ring bearing.

The stress region of the rotor shroud is a region of the rotor shroud surrounding a plurality of bolt holes that are configured to bolt the rotor shroud to a variable diffuser.

The deflection region of the rotor shroud is a region of the rotor shroud that is subject to deflections.

The deflection region of the rotor shroud is a region of the frustoconical portion adjacent the flared portion that is positioned radially outward from tips of blades on the rotor.

The deflection region of the rotor shroud is a flange extending outward from the disk portion of the rotor shroud that abuts a drive ring bearing.

The energy containment region of the rotor should is a region of the rotor shroud that is configured to contain energy.

The energy containment region of the rotor shroud is a region of the frustoconical portion adjacent a first side and a radially inner end of the rotor shroud that is positioned radially outward from blades on the rotor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotor shroud for a rotary machine comprising:
   a disk portion centered on a central axis of the rotor shroud;
   a frustoconical portion extending from the disk portion;
   a flared portion extending from the frustoconical portion; and
   a variable lattice structure in an interior of the rotor shroud, the variable lattice structure comprises:
      a first region of the rotor shroud having a first lattice structure; and
      a second region of the rotor shroud having a second lattice structure;
      wherein the second lattice structure of the second region is denser than the first lattice structure of the first region; and
      wherein the second region is a deflection region, a stress region, or an energy containment region of a flange of the disk portion, an area of the frustoconical portion, or an area surrounding a bolt hole of the rotor shroud.

2. The rotor shroud of claim 1, wherein the rotor shroud has a continuous exterior solid surface surrounding the variable lattice structure.

3. The rotor shroud of claim 1, wherein the stress region of the rotor shroud is a region of the rotor shroud that is subject to higher stress than other regions of the rotor shroud.

4. The rotor shroud of claim 3, wherein the stress region of the rotor shroud is a flange extending outward from the disk portion of the rotor shroud.

5. The rotor shroud of claim 3, wherein the stress region of the rotor shroud is a region of the rotor shroud surrounding a plurality of bolt holes.

6. The rotor shroud of claim 1, wherein the deflection region of the rotor shroud is a region of the rotor shroud that is subject to deflections.

7. The rotor shroud of claim 6, wherein the deflection region of the rotor shroud is a region of the frustoconical portion adjacent the flared portion.

8. The rotor shroud of claim 6, wherein the deflection region of the rotor shroud is a flange extending outward from the disk portion of the rotor shroud.

9. The rotor shroud of claim 1, wherein the energy containment region of the rotor should is a region of the rotor shroud that is configured to contain energy.

10. The rotor shroud of claim 9, wherein the energy containment region of the rotor shroud is a region of the frustoconical portion adjacent a first side and a radially inner end of the rotor shroud.

11. The rotor shroud of claim 1, wherein the rotor shroud is made of a material selected from the group consisting of stainless steel, corrosion-resistant steel, nickel-chromium alloy, aluminum, synthetic fiber, fiberglass, composites, and combinations thereof.

12. A rotary machine comprising:
a tie rod extending through the rotary machine;
a rotor mounted on the tie rod; and
a rotor shroud positioned radially outward of the rotor, wherein the rotor shroud comprises:
  a disk portion centered on a central axis of the rotor shroud;
  a frustoconical portion extending from the disk portion;
  a flared portion extending from the frustoconical portion; and
  a variable lattice structure in an interior of the rotor shroud, the variable lattice structure comprises:
    a first region of the rotor shroud having a first lattice structure; and
    a second region of the rotor shroud having a second lattice structure;
    wherein the second lattice structure of the second region is denser than the first lattice structure of the first region; and
    wherein the second region is a deflection region, a stress region, or an energy containment region of a flange of the disk portion, an area of the frustoconical portion, or an area surrounding a bolt hole of the rotor shroud.

13. The rotary machine of claim 12, wherein the stress region of the rotor shroud is a region of the rotor shroud that is subject to higher stress than other regions of the rotor shroud.

14. The rotary machine of claim 13, wherein the stress region of the rotor shroud is a flange extending outward from the disk portion of the rotor shroud that abuts a drive ring bearing.

15. The rotary machine of claim 13, wherein the stress region of the rotor shroud is a region of the rotor shroud surrounding a plurality of bolt holes that are configured to bolt the rotor shroud to a variable diffuser.

16. The rotary machine of claim 12, wherein the deflection region of the rotor shroud is a region of the rotor shroud that is subject to deflections.

17. The rotary machine of claim 16, wherein the deflection region of the rotor shroud is a region of the frustoconical portion adjacent the flared portion that is positioned radially outward from tips of blades on the rotor.

18. The rotary machine of claim 16, wherein the deflection region of the rotor shroud is a flange extending outward from the disk portion of the rotor shroud that abuts a drive ring bearing.

19. The rotary machine of claim 12, wherein the energy containment region of the rotor should is a region of the rotor shroud that is configured to contain energy.

20. The rotary machine of claim 19, wherein the energy containment region of the rotor shroud is a region of the frustoconical portion adjacent a first side and a radially inner end of the rotor shroud that is positioned radially outward from blades on the rotor.

* * * * *